Patented Jan. 1, 1946

2,391,895

UNITED STATES PATENT OFFICE 2,391,895

METHOD OF CONDITIONING BOILER WATER

Lewis O. Gunderson, Park Ridge, Ill., assignor to Dearborn Chemical Company, Chicago, Ill., a corporation of Illinois No Drawing. Application March 18, 1942, Serial No. 435,223

19 Claims. (Cl. 210—23)

This invention relates to a method of conditioning boiler water for the prevention or reduction of foaming in boilers, for the prevention or reduction of moisture entrainment in steam produced from effervescent waters, for the prevention or reduction of siliceous scale formation in boilers, for the prevention or reduction of intercrystalline cracking of the boiler steel, for the prevention or reduction of corrosion of boiler metals, and for the solubilization of calcium and magnesium sludges in boiler water.

This application is a continuation-in-part of my pending application Serial No. 261,683, entitled "Method of conditioning boiler water," filed March 13, 1939.

One of the major problems confronting all industries concerned with the generation of steam, whether it be for railroad locomotives, stationary power plants, or marine boilers, is the serious damage to reciprocating engines, turbines or other prime movers due to the carry over of water with the steam. Such carry over results in deposits of mineral matter in superheaters, throttles, valves, cylinders, turbine blades and the like.

This water carry over is the result of phenomena known as boiler foaming and as effervescence. Boiler foaming occurs when the steam bubbles generated within the boiler show increased resistance to coalescence resulting in gradually increased expansion of the boiler water in the steam generating area with more or less accumulation of foam at the surface, until finally the entire steam space is closed off and foam is entrained with the steam leaving the boiler.

The term "effervescence" signifies the phenomenon of steam bubbles rising through the water and bursting at the surface with considerable violence causing the projection of water droplets for considerable distances above the water surface. The smaller of such droplets are entrained with the steam leaving the boiler. The entrainment of moisture resulting from this effervescence is proportional to the rate of steam draw off. When the velocity of the steam above the water surface is very great, the entrainment of water particles projected into the steam space by effervescence is particularly great. It is obvious that water carry over due to effervescence will be the greater the closer the water surface is to the steam outlet. Therefore, if a boiler water has considerable foaming tendency, coupled with an effervescent character, water entrainment by the steam will occur, first, by the carry over of particles of moisture projected into the steam space by effervescence, and, periodically, by the carry over of the foamy surface layer of the water itself, involving a much larger percentage of boiler water entrainment with the steam.

Although there are numerous factors affecting foam formation, it appears that the function of surface-active organic matter is of primary importance in the formation of foam. Potentially surface-active organic matter contained in boiler feed waters obtained from surface supplies as well as from deep wells tends to be adsorbed by colloidal material dispersed in the boiler water, particularly at certain concentrations of dissolved and dispersed matter. The exact concentrations at which such adsorption will occur depends on the prevailing alkalinity, the nature of the adsorbed organic material and on the nature of the dissolved mineral matter encountered in feed water from various sources. Such adsorption results in the mutual increase of surface-activity of the organic matter and the dispersed matter causing adsorption in the steam bubble films and water surfaces to the extent of forming more or less stable surface films. Foaming is thought to be due to the formation of such stable surface films.

I have found that there is a correlation between surface tension and water carry over due to effervescence. The higher the surface tension, the greater will be the tendency toward carry-over due to effervescence. It is believed that relatively higher surface tension is accompanied by increased hydration of the surface films in the boiler water. On the other hand, the foaming tendency of the boiler water is not necessarily correlated with the magnitude of the surface tension of the water, although it has been observed that maximum development of foam generally is associated with a considerable decrease in surface tension. Foam formation may occur when relatively high surface tension prevails. Under such circumstances foam formation may involve a rather large carry over of water, since the amount of water contained within the surface films may be large.

The present invention provides a method that will eliminate the formation of foam and will prevent the undesirable expansion of the boiler water in the steam generating zone, thus maintaining the surface of the water in the boiler at a low level. Under such conditions a maximum steam space and minimum steam velocity are maintained. Any water droplets projected into the steam space by the rupture of steam bubbles will be pulled back to the water surface by gravity before the droplets can reach the steam outlet.

I believe that the method of this invention brings about the above indicated effects by eliminating the forces tending to prevent the coalescence of steam bubbles and by providing surface films characterized by a surface tension and a surface film hydration that do not reach undesirably high values.

My process comprises incorporating with the boiler water colloidal micelles containing silica and heavy metal oxides or hydroxides wherein the ratio of silica to metal oxide is relatively large, preferably at least 4 to 1. Such micelles are believed to prevent foam formation due to their action on the potentially surface-active organic matter contained in boiler feed waters and boiler waters.

Besides preventing or lessening foam formation and water entrainment, the provision of such micelles in boiler water will prevent or reduce siliceous scale formation in boilers, intercrystalline cracking of boiler steel, corrosion of boiler metals, and will solubilize calcium and magnesium sludges in boiler waters.

It is therefore an important object of the present invention to provide methods of conditioning boiler water and boiler feed water that will generally facilitate the operation of steam boilers and prevent deterioration of steam boilers.

Another object of the present invention is to provide a method of treating boiler water and boiler feed water that will accomplish the specific advantages mentioned hereinabove.

A further object of this invention is to provide a method of treating boiler water and boiler feed water by incorporating therein siliceous micelles containing heavy metal oxides, the silica-metal oxide ratio preferably being at least 4 to 1.

Another and further objects and features of this invention will become apparent from the following detailed description and appended claims.

In order to provide colloidal micelles of the nature indicated, I prefer to add to boiler water or boiler feed water colloidal silicic acid. Soluble heavy metal salts are also added that will, on being added to conventionally softened and hence alkaline boiler feed waters, produce the corresponding metal oxide or hydroxide. Such metal oxides and hydroxides have high affinities for colloidal silica. By adding traces or very small amounts of the metal salts, the desired high silica-metal oxide ratio is assured. I believe that the effect of these additions can be explained by the resulting formation of micelles which adsorb large quantities of organic matter from the boiler feed water or the boiler water and thus prevent this organic matter from forming and stabilizing foam. However, knowledge of the complete mechanism of the reaction whereby the desired results are obtained is not necessary for carrying out the method of this invention for the purpose indicated.

The desired silica-metal oxide hydrosols having a high silica-metal oxide ratio may thus be produced by the separate but optionally contemporaneous addition of colloidal silicic acid and heavy oxides to boiler water or boiler feed water. The same hydrosols may be produced by mixing colloidal silicic acid with dilute solutions of heavy metal compounds in a separate container. These two substances after being mixed are diluted greatly to form a 2 to 5% solution of silica-heavy metal oxide hydrosols, which dilute solution can then be added to the boiler feed water at a ratio such that the boiler feed water will be treated with approximately 0.02 to 5 parts per million of heavy metal compounds and from 0.08 to 0.120 or more parts per million of colloidal silicic acid. This rate of addition is also that preferred when the siliceous and metalliferous ingredients are added separately. The above mentioned dilute solution of inorganic micelles may also contain cooperative reagents mentioned elsewhere in this application, such as carboxylic acids and their alkali salts, sodium nitrate, organic protective colloids such as tannins, lignin, and the like.

The method of this invention is particularly designed for treating conventionally softened boiler feed waters such as are almost universally used in this country. Conventional softening usually takes the form of addition of soda ash or caustic soda directly to the boiler feed waters before delivery of the latter to the boiler. Sometimes the soda ash or caustic soda are compounded with various organic materials, as in many proprietary boiler water treatments, or soda ash in conjunction with lime may be used in a lime-soda softener wherein the calcium and magnesium sulfates and bicarbonates are precipitated almost completely before the water is delivered to the boiler. The method of this invention is also suitable for use with zeolite softened water. In any case, the boiler feed waters conventionally are provided with excess sodium alkalinity equivalent to 15 to 30% of the total dissolved solids. Initiation of the present process, particularly in locomotive boiler, is best carried out with an excess alkalinity of at least 30% of the dissolved solids in the boiler water. Subsequently, as the concentration of dissolved solids in the boiler water increases, it is possible to decrease the alkalinity to 10% of the total solids or less, thus effecting a saving in the amount of softening chemicals required for the boiler feed waters.

Any of the soluble salts (such as the sulfates, chlorides, and nitrates) of the heavy metals, which for the purpose of this invention may be defined as any metal having a density greater than 4, for instance, manganese, chromium, cobalt, zinc, zirconium, thorium, tin, nickel, titanium, vanadium, and others, are operative when used to form the metal oxide ingredient of the inorganic micelles thought to be the efficient factors in foam prevention according to my method. Any one of the heavy metal salts may be used or any combination of heavy metal salts. The salts may be added in aqueous solutions or in powdered crystalline form to boiler water or boiler feed water. Colloidally dispersed metal oxides or hydroxides may also be added.

Only very small amounts or traces of heavy metals need be added to bring about the desired results. A preferred dosage is from about 0.02 to 0.05 parts per million of boiler water. In the case of greatly contaminated boiler feed oxide hydrosols. These boiler feed waters are water or boiler water, the amount of heavy metal salt, oxide or hydroxide may be increased, the amount of silicic acid added being increased correspondingly. Generally not more than two parts per million of heavy metal oxide are added, the upper limit being not more than five parts per million.

Precaution should be taken, when the heavy metal compounds are added to boiler feed water, to guard against removal by flocculation or absorption of the heavy metal oxides or hydroxides produced by adding heavy metal salts to alkaline boiler feed water. Protective colloids such as tannin, sulfite waste liquor, gum arabic or the like may be added to the feed water. Peptizing agents may also be added, for instance, alkali nitrates, alkali sulfocyanides, alkali thiocyanates, thiourea and the like. Tannin or like protective colloids may be added at a rate of about 6 to 12 parts per million. Sodium nitrate fed at the rate of at least 20 parts per million may be substituted for the tannin.

As an illustration of the manner of adding heavy metal compounds may be mentioned the use of a solution containing 5% manganese sulfate and 5% chrome alum (chromium potassium sulfate). By means of a suitable proportioning mechanism this solution may be automatically fed to boiler feed water flowing into a locomotive water tender at the rate of 0.02 parts of heavy metal compound per one million parts of water.

In some territories boiler feed waters may be obtained that naturally contain enough colloidal silica for combination with heavy metal compounds added as disclosed hereinabove to prevent foam formation. However, to insure proper foam prevention, it is desirable to add, in all cases, colloidal silicic acid in amounts sufficient to establish the desired silica-heavy metal oxide ratio. An excess of silica is not harmful. The colloidal silicic acid is preferably added as a dilute acidified solution, which on aging becomes more efficient for foam prevention. This improved foam prevention is thought to be due to polymerization of the silicic acid molecules on standing of the acidified colloidal solution.

In the case of locomotive boilers, such aged or polymerized silicic acid solution may be fed to boiler water flowing into a locomotive tender by suitable proportioning means to treat such water at the rate of 0.120 parts of silica per one million parts of water. Preferably this silicic acid is fed into the boiler water at the same time as the heavy metal compounds are added to the water and in such a manner that the silica and heavy metal compounds will commingle as much as possible. The ratio of silica to metal oxide should be at least 4 to 1 and preferably at least 6 to 1. When boiler feed water is treated that is known to contain considerable amounts of colloidal silicic acid, the amount of the added colloidal silicic acid may be reduced accordingly.

In some territories boiler feed waters contain large quantities of alkali salts, for instance, in excess of 500 parts per million of alkali sulfates or chlorides, together with greater or smaller amounts of calcium and magnesium compounds. Such waters usually contain relatively large amounts of dissolved silica. When the silica content is considerable, such as 4% or more of the total dissolved solids, it appears that an appreciable portion of this silica is present in the form of colloidal silicic acid or hydrated silica-metal usually amenable to processing by the addition of suitable heavy metal compounds alone. This is particularly true where these waters contain considerable amounts of sodium bicarbonate or free carbon dioxide dissolved in the boiler water, for the carbonic acid tends to force silica into the colloidal state.

A possible explanation for the foam prevention effected according to this invention by the addition of heavy metal compounds and of enough colloidal silica to make up a heavy metal oxide-silica ratio of at least 1 to 4 is the above-mentioned formation of micelles due to the adsorption of the heavy metal oxides or hydroxides by the colloidal silicic acid. As surface-active foam forming and foam stabilizing organic matter is progressively adsorbed by the highly siliceous micelles the latter will become increasingly more surface-active and will accordingly be adsorbed in the steam bubble films and the water surfaces. There will thus be formed concentrated surface layers of adsorptive siliceous micelles which will continue to adsorb surface-active organic substances that naturally accumulate in the steam bubble films and the water surfaces. Such progressive adsorption of organic substances will eventually cause flocculation of the inorganic micelles together with their loads of adsorbed organic matter. The flocculated micelles will accordingly be precipitated to the bottom of the boiler where the precipitate can be removed by blowing off through the blow-off valve.

The present invention involving the addition of heavy metal compounds and of enough colloidal silicic acid to effect a metal oxide-colloidal silica ratio of at least 1 to 4 should be clearly distinguished from conventional addition of metal compounds such as alum or aluminum sulfate for the purpose of clarifying or otherwise purifying water. Such conventional treatment involves the addition of metal compounds far in excess of the amounts added according to the present invention, which generally do not exceed five parts per million and as a rule are less than two parts per million.

The present method should also be distinguished from conventional methods of adding heavy metal salts to water containing dissolved silica for the purpose of removing the dissolved silica. In the conventional treatment, the heavy metal salts are added in at least stoichiometrical proportions to the total silica present, whereas in the present invention heavy metal compounds are added in less than stoichiometrical proportions to that part of the silica present in colloidally dispersed form.

I have found it advantageous to add the heavy metal compounds suspended in vehicles including a sodium hydroxide solution having organic protective colloids incorporated therewith, for instance, quebracho extract, tannin and the like. Such preparations, besides being non-freezing and non-corrosive, have some softening effect when added to the boiler feed water. The heavy metal compounds contained in such preparations are thought to be in a colloidally dispersed state. It is believed that when such preparations are fed to boiler feed water at the rate, say, of 0.02 parts per million of the metal compound, the resulting dilution will cause formation of the corresponding metal oxide or hydroxide which will subsequently react with appropriate amounts of colloidal silica to form the desired inorganic hydrosol. A formula for preparing a ten-drum batch of such a preparation is given hereinbelow by way of an example.

|  | Percent | Pounds |
| --- | --- | --- |
| Water | 32.5 | 1,950 |
| Chromium sulfate | 3.0 | 180 |
| Manganous sulfate | 1.0 | 60 |
| Tartaric acid | 4.0 | 240 |
| Cane sugar | 4.0 | 240 |
| Stannic chloride (containing 5 molecules of water of crystallization) | 0.3 | 18 |
| Zinc chloride (anhydrous) | 0.2 | 12 |
| Liquid caustic soda | 40.0 | 2,400 |
| Liquid quebracho | 15.0 | 900 |

The preparation may be made up by running thirty gallons (250 lbs.) of water into a suitable container. A clean, uncoated fifty-five gallon open head drum is satisfactory. 180 pounds of chromium sulfate are added, and the mixture is agitated and heated with steam until all the material is in solution. 60 pounds of manganous sulfate and 40 pounds of tartaric acid are added and stirred until dissolved. Then 18 pounds of stannic chloride and 12 pounds of zinc chloride are added and stirring is continued until all the material is in solution. The mixture is then weighed and the amount of condensate from the steam used for heating and agitation is determined. About four gallons of condensate are usually formed in this operation.

Then the balance of the water specified in the formula, or approximately 1700 pounds (2100 pounds less 250 pounds condensate to be expected) are run into a mixing tank equipped with a mechanical stirring device. 200 pounds of tartaric acid and 240 pounds of cane sugar are added while continuous agitation is effected. The chromium sulfate, manganese sulfate, tartaric acid, stannic chloride and zinc chloride solution whose preparation has been described in the preceding paragraph is then added. Then, with constant agitation, 2400 pounds of liquid caustic soda and finally 900 pounds of liquid quebracho extract are run in. The preparation is then mixed thoroughly for about fifteen minutes before it is run into steel drums for shipment.

The same composition may be prepared with stannous chloride substituted for stannic chloride, which is difficult to store and handle. An amount of stannous chloride containing as much tin as the specified amount of stannic chloride is dissolved in 100 pounds of water. 6 pounds of tartaric acid are added and stirred into solution. No heat is required to dissolve either the stannous chloride or the tartaric acid. An amount of sodium dichromate appropriate to convert the stannous chloride to stannic chloride is then added, followed by 60 pounds of liquid caustic soda. After reaction the completed mixture is ready for incorporation in the regular formula as originally described. The amount of chromium obtained from the sodium dichromate is calculated to chromium sulfate and subtracted from the total amount of chromium sulfate required in the complete formula. The reaction between the stannous chloride, sodium dichromate and sodium hydroxide is very violent. A large amount of heat is evolved and for better control of the reaction no heat should be applied at any stage of this reaction.

Chrome alum may be used in place of chromium sulfate, the specified percentages of all the constituents being retained. The reduced chromium content of the resulting preparation does not affect the action of the formula.

The liquid caustic content of the formula may be reduced to 30% and the liquid quebracho extract may be increased to 40%, with a corresponding modification of the water content, to make a stable preparation.

In the above preparation the chromium, thought to be present in the form of colloidal chromium hydroxide, is effective to keep the other metal oxides in colloidal solution. The tartaric acid and the sugar are stabilizing agents preventing precipitation of the colloidally dispersed matter, the tartaric acid being particularly effective to solubilize the chromium hydroxide. The tartaric acid may be reduced to 1% without jeopardizing the stability of the preparation. In place of tartaric acid alkali tartrates or Rochelle salts may be used.

Changes other than those indicated may also be made in the above formula, which is given solely by way of an illustrative example.

Powdered preparations may also be applied to furnish boiler water with heavy metal compounds as called for by the method of this invention. Examples of formulae for such compositions are given hereinbelow.

Formula A

| | Grams |
|---|---|
| Chrome alum | 0.75 |
| Manganese sulfate | 0.25 |
| Stannic chloride | 0.1 |
| Aluminum chloride | 0.1 |
| Zinc chloride | 0.1 |
| Rochelle salts | 10.0 |
| Sodium nitrate | 22.0 |
| Quebracho extract | 65.0 |
| Sodium carbonate | 355.0 |

Formula B

| | Grams |
|---|---|
| Chrome alum | 0.75 |
| Manganese sulfate | 0.25 |
| Sodium nitrate | 300.0 |
| Sodium tartrate | 25.0 |
| Sodium carbonate | 127.3 |

These two formulae yield compositions designed for addition to boiler feed water at the rate of one pound for each 10,000 gallons and may be added directly to the locomotive boiler water tender when taking water so as to insure good mixing of the chemicals with the water. Formula A is designed for boiler feed waters that have relatively low excess alkalinity either as sodium carbonate or as caustic soda. Formula B would serve for addition to boiler feed waters that have relatively higher excess sodium alkalinity either as sodium carbonate or caustic soda, such as 6 to 10 grains of alkalinity expressed as sodium carbonate. The purpose of the sodium carbonate in Formula A is to insure an alkaline medium for the heavy salts capable of converting the heavy metal salts to their oxides or hydroxides. These formulae for powdered compositions are only given as examples of preparations of this type. Many other formulae can be made up that yield compositions that will function in a similar manner.

An example of a preparation of colloidal silicic acid will now be given.

Formula

| | Per cent | Pounds |
|---|---|---|
| Water | 94.75 | 4,359.0 |
| Sodium silicate | 4.10 | 188.1 |
| Sulfuric acid (diluted 1-4 by volume) | 1.10 | 50.6 |
| Liquid quebracho extract | 0.05 | 2.3 |

Procedure 4359 pounds (524 gallons) of water are run into a mixing tank equipped with a mechanical stirring device or air agitator. 188.1 lbs. of a sodium silicate solution having a density of 35.5° Baumé and containing 6.3% $Na_2O$ together with 24.6% $SiO_2$ are added and mixed thoroughly. 45.0 pounds of the dilute sulfuric acid are then added with constant stirring. The alkalinity of the resulting mixture is determined in a 50 cc. sample by titration to a methylorange end point with N/10 sulfuric acid. A titration value of 12 to 13 cc. of N/10 sulfuric acid on a 50 cc. sample is desired. This titration value is equivalent to an alkalinity of 1200 to 1300 parts per million. Additional dilute sulfuric acid is added until the desired titration is obtained. The 50.6 pounds of dilute sulfuric acid specified in the formula is only an average or approximate value. Each batch prepared requires somewhat different amounts of acid. Addition of excess acid and restoration to proper alkalinity should be avoided.

When the alkalinity has been properly adjusted, 2.3 pounds of liquid quebracho extract are added, and the material is thoroughly mixed and run into containers coated on the inside with high melting petrolatum. Uncoated drums have been found to promote local gel formation at the liquid surface contracting the drum.

This colloidal silicic acid solution, when properly prepared, is quite stable and will retain its colloidal nature for a satisfactory period of time.

Any other sodium silicate than the particular solution disclosed hereinabove may be used in preparing colloidal silicic acid according to the above formula, although the disclosed solution is more satisfactory due to its relatively high silica content. This allows the use of a smaller amount of acid in the reduction of the alkalinity and a consequent smaller total solids content in the finished composition, which has been found to promote stability. When any other sodium silicate is used, the amount used should be adjusted to provide a 1% silica ($SiO_2$) content in the finished composition.

Compositions such as those disclosed have been successfully used to condition water to a permanently non-foaming condition in a modern locomotive boiler operating over 700 miles of track for 18,000 miles through a recognized bad water territory where foaming is a common occurrence. The average concentration of boiler water salines maintained normally without my treatment approximates 3000 parts per million, requiring a blow-down waste of approximately 15% of the feed water used, whereas after my conditioning process becomes fuly effective, a saline concentration of over 59,000 parts per million was reached without requiring any blow-down. This performance has been duplicated on railroads in widely separated parts of this country, producing non-foaming boiler waters having saline concentrations reaching over 35,000 parts per million.

It has been found from actual experience in railroad service that it is not absolutely essential to add the conditioning composition or compositions every time boiler feed water is added to the locomotive tender. The conditioning compositions may be added only at some of the boiler feed supplies, for instance, at every other water station where a locomotive is supplied with feed water. The functioning of the foam preventing process appears to become progressively effective the longer the boiler is in use, lesser and lesser amounts of conditioning composition being required.

The above disclosed method of conditioning is effective not only to prevent or reduce water carry over due to foaming or effervescence but also has a remarkable effect on precipitated calcium and magnesium sludges in boiler water. Such sludges are preventing from precipitating as crystalline deposits at the bottom of the boiler, where such crystalline deposits are very objectionable, particularly in the mud ring of the firebox of the locomotive, as the fire side of the sheets may become overheated and damaged due to the calcium-magnesium precipitates accumulating in such fashion as to prevent water from contacting the hot sheets. My conditioning process causes the precipitated calcium and magnesium carbonates to be more or less solubilized or dispersed in the boiler water. A possible explanation for this fact is that the siliceous micelles may peptize the calcium and magnesium carbonates to the extent that the same are colloidally or otherwise dispersed. Possibly the micelles, being highly hydrated, serve to render the sludge sufficiently hydrated to prevent accumulation of the sludge particles as a packed dense mass at the bottom of the boiler. This prevention of caking is an important feature of the present method, which lessens the amount of blowing off required to an extent that otherwise would permit the accumulation of undesirable crystalline sludges in the bottom portions of the boiler. Thus the lessened blowing-off obtained by the present method is not accompanied by any danger of crystalline deposits forming in the boiler, so that the benefits accruing from the practical elimination of blow-offs can be freely made use of.

In the case of feed waters that naturally contain large amounts of silica, the addition of tartaric or citric or oxalic acids or other carboxylic acids or alkali salts thereof improves the functioning of my method of preventing foam formation. The same is true of inorganic salts such as nitrates, chlorides or sulfates, although much larger concentrates of such inorganic salts are required for the same results. I prefer to use Rochelle salts, tartaric acid, or the alkali tartrates, added to the boiler feed water at the rate of approximately 0.1 part per million or more, depending on the specific character of the boiler feed waters encountered. The mechanism by which these salts and acids contribute to the prevention of the foam formation is not certain. However, it is presumed that the anions of these salts or acids are adsorbed by the inorganic micelles, displacing adsorbed water and thus dehydrating the micelles. Much greater concentrations of alkali sulfates or chlorides or the like have the same effect. The addition of small concentrations, say, not more than one part per million, of carboxylic acid or alkali carboxylates is therefore particularly useful in the initial stages of the processing of water in districts where the boiler feed waters have a relatively low alkali salt content, i. e., less than 400 parts per million. At the initiation of treatment according to the present method, after washout or water change in the boiler, sodium carbonate, sodium sulfate or other alkali salts may be added at the rate of 400 parts per million or more, in place of or together with carboxylic acids or salts.

The usual railroad practice is to wash out locomotive boilers at least once a month in compliance with Federal statutes. Very often the boilers are given water changes or boiler washouts at more frequent intervals, at which time the concentrated boiler water is blown off into a storage tank or reservoir, or is run off to waste. If saved, this boiler water is customarily used for washing out other boilers and subsequently run off to waste. Boiler water that has been conditioned by my method permits steam generation without carry over of water and contains, besides a desirable concentration of softening chemicals such as sodium carbonate and caustic soda, alkali salts such as sulfates and chlorides built up to a concentration such that very little and in some cases no additional addition of colloidal silica and heavy metal compounds are required to maintain a non-foaming condition. For this reason, it is advisable to collect and reuse boiler water conditioned according to my process rather than to start conditioning with untreated water and by addition of conditioning agents and gradual increase in concentration of dissolved solids gradually reach a permanently or almost permanently non-foaming and non-effervescing condition, as may be done by the present conditioning method. The boiler water content of sodium carbonate usually is converted to sodium hydroxide after long periods in the boiler. The carbonate ion is usually thought more desirable in boiler water than the hydroxide ion. Therefore, waste flue gases or other gases containing carbon dioxide may be passed through the used boiler water before reuse.

The maintenance of silica-metal oxide hydrosols in boiler water, as called for by the present invention, will also prevent the so-called "intercrystalline cracking" of the boiler metal along leaky seams, especially in the presence of the supplementary substances used in my process, such as the carboxylic acids and their salts, alkali nitrates, tannins and the like. This preventive action I believe to be due to the flocculation or precipitation of the micelles in or on the metal grain boundaries to insulate these areas from the caustic boiler water. Apparently the micelles adsorb the metal ions set free at metal surfaces being corroded so that the micelles have their silica-metal oxide ratio progressively reduced to the point where the micelles are precipitated as metal silicates on or adjacent the metal surface being corroded, whereby the latter is sealed off from contact with the corroding solution. At least the precipitated micelles will prevent the exit of dissolved metal ions from boiler water confined within cracks in the boiler metal, so that this confined water will soon become saturated with metal ions and hence be unable to effect further corrosion.

Oxidizing agents, in particular, sodium nitrate, make for more efficient prevention of intercrystalline cracking. This effect is probably due to an oxidation of the metal surface being corroded to the ferric state, converting this surface to ferric oxide or hydroxide which is strongly adsorbed by the siliceous micelles. Therefore, any suitable oxidizing agent used in conjunction with the siliceous micelles will aid in preventing grain boundary corrosion and crystalline embrittlement. The metal may also be preoxidized with a strong oxidizing agent before water is admitted into the boiler. The oxidized surface may then react metathetically with the siliceous micelles to form a protective layer.

General corrosion of the boiler metal is prevented similarly to the prevention of intercrystalline cracking by the metal oxide-silica hydrosols used in the present invention, particularly when used in conjunction with sodium nitrate or other oxidizing agents, as described hereinabove.

Operation in a boiler of my foam prevention process also effects the removal of siliceous scale as well as the inhibition of formation of new siliceous scale. This result is believed due to the higher caustic alkalinity and total solids concentration that can be maintained in boiler water treated according to my process, which would promote dissolution of the silica.

Many details of composition and procedure may be varied without departing from the principles of this invention and without sacrificing the advantages mentioned hereinabove. It is therefore not my purpose to limit the patent granted on this invention otherwise than necessitated by the scope of the appended claims.

What I claim is:

1. The method of conditioning water for steam generation, which comprises incorporating with said water from a trace to five parts per million of a heavy metal compound selected from the group consisting of the colloidal oxides, the colloidal hydroxides, and the water soluble salts capable of forming colloidal oxides and hydroxides in said water, and incorporating with said water sufficient colloidal silica to establish in said water a colloidal silica-heavy metal oxide ratio of at least four to one.

2. The method of conditioning water for steam generation which comprises incorporating with said water from a trace to two parts per million of a heavy metal compound selected from the group consisting of the colloidal oxides, the colloidal hydroxides, and the water soluble salts capable of forming colloidal oxides and hydroxides in said water, and incorporating with said water sufficient colloidal silica to establish in said water a colloidal silica-heavy metal oxide ratio of at least four to one.

3. The method of conditioning water for steam generation which comprises incorporating with said water from a trace to five parts per million of a heavy metal compound selected from the group consisting of the colloidal oxides, the colloidal hydroxides, and the water soluble salts capable of forming colloidal oxides and hydroxides in said water, and incorporating with said water sufficient colloidal silica to establish in said water a colloidal silica-heavy metal oxide ratio of at least six to one.

4. The method of conditioning water for steam generation which comprises incorporating with said water from a trace to two parts per million of a heavy metal compound selected from the group consisting of the colloidal oxides, the colloidal hydroxides and the water soluble salts capable of forming colloidal oxides and hydroxides in said water, and incorporating with said water sufficient colloidal silica to establish in said water a colloidal silica-heavy metal oxide ratio of at least six to one.

5. The method of conditioning boiler water for steam generation which includes incorporating with said water from a trace to five parts per million of a water soluble heavy metal compound capable of forming a colloidal oxide and hydroxide in said water and incorporating with said water sufficient colloidal silica to establish in said water a colloidal silica-heavy metal oxide ratio of at least four to one.

6. The method of conditioning boiler water for steam generation which includes incorporating with said water from a trace to five parts per million of a water soluble heavy metal salt capable of forming a colloidal oxide and hydroxide in said water and incorporating with said water sufficient colloidal silica to form in said water a heavy metal oxide-silica hydrosol having a silica-heavy metal oxide ratio of at least four to one.

7. The method of conditioning alkaline boiler water which includes incorporating with said water a water soluble heavy metal salt in amounts varying from a trace to five parts per million, incorporating with said water at least 0.120 parts per million of colloidal silica to form a silica-heavy metal oxide hydrosol having a silica-heavy metal oxide ratio of at least 4 to 1, and incorporating with said water a compound capable of forming carboxylic anions in said water when dissolved therein.

8. The method of conditioning alkaline boiler water which includes incorporating with said water a water soluble heavy metal salt in amounts varying from a trace to five parts per million, incorporating with said water at least 0.120 parts per million of colloidal silica to form a silica-heavy metal oxide hydrosol having a silica-heavy metal oxide ratio of at least 4 to 1, and incorporating with said water at least 20 parts per million of sodium nitrate.

9. The method of conditioning alkaline boiler water for steam generation which includes incorporating with said water from a trace to five parts per million of a water soluble heavy metal salt capable of forming a colloidal oxide and hydroxide in said water, incorporating with said water a quantity of colloidal silica amounting at least to 0.120 parts per million and sufficient to form in said water a silica-heavy metal oxide hydrosol having a silica-heavy metal oxide ratio of at least four to one, and incorporating a protective colloid with said water to prevent precipitation of heavy metal oxides.

10. The method of conditioning alkaline boiler water for steam generation, which includes incorporating with said water from a trace to five parts per million of a water soluble heavy metal salt capable of forming a colloidal oxide and hydroxide in said water, incorporating with said water a quantity of colloidal silica amounting at least to 0.120 parts per million and sufficient to form a silica-heavy metal oxide hydrosol having a silica-heavy metal oxide ratio of at least four to one, and incorporating with said water a peptizing agent to prevent precipitation of heavy metal oxides.

11. The method of conditioning boiler water for steam generation which includes establishing a total solids content of at least four hundred parts per million and a sodium alkalinity of at least 15 parts per million in said water, incorporating with said water from a trace to five parts per million of a heavy metal compound selected from the group consisting of the colloidal oxides, the colloidal hydroxides, and the water soluble salts capable of forming colloidal oxides and hydroxides in said water, and incorporating with said water sufficient colloidal silica to establish in said water a colloidal silica-heavy metal oxide ratio of at least four to one.

12. The method of preventing intercrystalline cracking and corrosion in a boiler, which includes incorporating with the boiler water from a trace to five parts per million of a heavy metal compound selected from the colloidal oxides, the colloidal hydroxides, and the water soluble salts capable of forming colloidal oxides and hydroxides in said water, and incorporating with said water sufficient colloidal silica to establish in said water a colloidal silica-heavy metal oxide ratio of at least four to one.

13. The method of conditioning boiler water containing at least 0.120 parts per million of colloidal silica which includes incorporating with said water a water soluble heavy metal salt in an amount ranging from a trace to five parts per million and adapted to form a silica-heavy metal oxide hydrosol having a silica-heavy metal oxide ratio of at least 4 to 1.

14. The method of conditioning boiler water which includes incorporating therewith a colloidal heavy metal oxide in amounts varying from a trace to five parts per million and incorporating with said water sufficient colloidal silica to establish in said water a colloidal silica-heavy metal oxide ratio of at least 4 to 1.

15. The method of conditioning boiler water which includes incorporating with said water colloidal chromium hydroxide in amounts varying from a trace to five parts per million and incorporating with said water sufficient colloidal silica to establish in said water a colloidal silica-heavy metal oxide ratio of at least 4 to 1.

16. The method of conditioning boiler water which includes incorporating with said water colloidal chromium hydroxide dispersed in a sodium hydroxide solution together with other heavy metal oxides also dispersed in said sodium hydroxide solution, the total amount of heavy metal oxides and hydroxides in said water after said incorporation varying from a trace to five parts per million, and incorporating with said water sufficient colloidal silica to establish in said water a colloidal silica-heavy metal oxide ratio of at least 4 to 1.

17. A composition for treating boiler water comprising an aqueous 2 to 5% colloidal solution containing colloidal silicic acid and a heavy metal oxide in a ratio of at least 4 to 1.

18. The method of preventing intercrystalline cracking and corrosion in a boiler which includes incorporating with the boiler water an oxidizing agent capable of oxidizing the boiler metal surface, incorporating with the boiler water from a trace to five parts per million of a heavy metal compound selected from the colloidal oxides, the colloidal hydroxides, and the water soluble salts capable of forming colloidal oxides and hydroxides in said water, and incorporating with said water sufficient colloidal silica to establish in said water a colloidal silica-heavy metal oxide ratio of at least six to one.

19. The method of preventing intercrystalline cracking and corrosion in a boiler, which includes preoxidizing the boiler metal surface, incorporating with the boiler water from a trace to five parts per million of a heavy metal compound selected from the group consisting of the colloidal oxides, the colloidal hydroxides and the water soluble salts capable of forming colloidal oxides and hydroxides in said water, and incorporating with said water sufficient colloidal silica to establish in said water a colloidal silica-heavy metal oxide ratio of at least four to one.

LEWIS O. GUNDERSON.